United States Patent
Su et al.

(10) Patent No.: US 11,604,522 B1
(45) Date of Patent: Mar. 14, 2023

(54) DYNAMIC DATA TRANSMISSION FORMAT ADJUSTMENT METHOD AND WIRELESS PERIPHERAL DEVICE USING SAME

(71) Applicant: Primax Electronics Ltd., Taipei (TW)

(72) Inventors: Chun-Nan Su, Taipei (TW); Chih-Feng Chien, Taipei (TW); Yun-Jung Lin, Taipei (TW); Chin-An Lin, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 17/724,144

(22) Filed: Apr. 19, 2022

(30) Foreign Application Priority Data

Dec. 23, 2021 (TW) .................................. 110148524

(51) Int. Cl.
G06F 3/038 (2013.01)
G06F 3/02 (2006.01)
G06F 3/0362 (2013.01)

(52) U.S. Cl.
CPC .............. *G06F 3/038* (2013.01); *G06F 3/02* (2013.01); *G06F 3/0362* (2013.01); *G06F 2203/0384* (2013.01)

(58) Field of Classification Search
CPC .................................... G06F 3/038; G06F 3/02
See application file for complete search history.

(56) References Cited

U.S. PATENT DOCUMENTS

| | | | | |
|---|---|---|---|---|
| 7,228,323 | B2* | 6/2007 | Angerer | H03M 7/30 708/203 |
| 7,660,611 | B1* | 2/2010 | Asbury | G06F 1/3271 455/574 |
| 7,813,816 | B2* | 10/2010 | Fulton | G05B 19/054 702/183 |
| 9,277,857 | B1* | 3/2016 | Berme | A61H 5/00 |
| 2013/0179108 | A1* | 7/2013 | Joseph | G01D 18/00 702/104 |
| 2014/0011575 | A1* | 1/2014 | Neubauer | G06Q 50/34 463/25 |
| 2015/0363478 | A1* | 12/2015 | Haynes | G06Q 10/06 707/610 |
| 2017/0168782 | A1* | 6/2017 | Boyd | G11B 27/031 |
| 2017/0252645 | A1* | 9/2017 | McClive | G06F 3/0484 |
| 2017/0255279 | A1* | 9/2017 | McClive | A63F 13/22 |

* cited by examiner

*Primary Examiner* — Chun-Nan Lin
(74) *Attorney, Agent, or Firm* — Kirton McConkie; Evan R. Witt

(57) ABSTRACT

A dynamic data transmission format adjustment method is provided. Firstly, a peripheral device raw input data is acquired from a device main body of a wireless peripheral device. Then, the peripheral device raw input data is converted into a variable-bit-length peripheral device transmission data according to a dynamic data transmission format conversion rule. Then, a network transmission packet containing the variable-bit-length peripheral device transmission data is generated, and the network transmission packet is transmitted to a wireless receiver of the wireless peripheral device. Then, the variable-bit-length peripheral device transmission data in the network transmission packet is converted and restored into a fixed-bit-length peripheral device transmission data according to the dynamic data transmission format conversion rule. Then, the fixed-bit-length peripheral device transmission data is transmitted from the wireless receiver to a computer host.

20 Claims, 8 Drawing Sheets

DYNAMIC DATA TRANSMISSION FORMAT ADJUSTMENT METHOD AND WIRELESS PERIPHERAL DEVICE USING SAME

FIELD OF THE INVENTION

The present invention relates to a dynamic data transmission format adjustment method and a wireless peripheral device using the method, and more particularly to a dynamic data transmission format adjustment method applied between a computer host and a peripheral device and a wireless peripheral device using the method.

BACKGROUND OF THE INVENTION

In the information field, a HID (human interface device) type peripheral device such as a mouse, a keyboard or a voice-controlled sound input device is widely used. The input information generated or acquired by the peripheral device is instantly and continuously transmitted to a computer host. Consequently, the input information can be judged and/or processed by the computer host.

In case that the peripheral device is operated in a wireless transmission manner, the cost of the cable (or the connecting wire) is reduced. In addition, the storage space and the operating distance are increased. For example, mouse devices are usually classified into two types, i.e., a wired mouse and a wireless mouse. In comparison with the wired mouse, the use of the wireless mouse can achieve the above technical advantages. Consequently, the wired mouse is gradually replaced by the wireless mouse.

Nowadays, various low power wireless peripheral devices (including the wireless mouse devices) have been introduced into the market. In the normal condition, the low power wireless peripheral device using one AA battery or two AAA batteries can be operated for the duration of about 24 months. However, in some situations, the use life of the battery is usually insufficient. For example, when the wireless mouse is used for playing the video game that requires the high-speed operation, the use life of the battery is usually shorter than expected. Due to the limitations of the fixed data transmission format for the wireless transmission between the wireless peripheral device and the computer host, a lot of unnecessary data are transmitted during the wireless transmission process. In other words, the conventional wireless transmission method for the wireless peripheral device is not a power-saving method.

The drawbacks of the conventional wireless transmission method will be described as follows. FIG. 1 is a schematic functional block diagram illustrating the data transmission between a conventional wireless peripheral device and a computer host. For example, the wireless peripheral device is a wireless mouse. As shown in FIG. 1, the wireless peripheral device comprises a device main body 10 (e.g., a wireless mouse body) and a wireless receiver 11 (e.g., a USB-type wireless mouse receiver). The device main body 10 and the wireless receiver 11 are in communication with each other in a wireless transmission manner. In addition, the wireless receiver 11 is electrically connected with a computer host 12 in a wired transmission manner.

The device main body 10 comprises a first control unit 101 and a wireless transmission unit 102. The first control unit 101 is used to receive a peripheral device raw input data R. In addition, the peripheral device raw input data R is converted into a fixed-bit-length peripheral device transmission data I by the first control unit 101 according to a fixed data transmission format conversion rule. For example, in case that the wireless peripheral device is the wireless mouse, the peripheral device raw input data R contains a key pressing data, a sensing displacement data (including a horizontal sensing displacement data and a vertical sensing displacement data) and a wheel displacement data (including a wheel scrolling displacement data and a wheel tilting displacement data).

The fixed data transmission format conversion rule is a rule for converting the peripheral device raw input data R into the fixed-bit-length peripheral device transmission data I according to the fixed conversion and storage strategy as shown in Table 1.

TABLE 1

| B1 | B2 | B3 | | B4 | B5 | B6 |
|----|----|----|----|----|----|----|
| BT_B | X LS_B | Y LS_N | X MS_N | Y MS_B | WR_B | WT_B |

During the wireless transmission process, the fixed-bit-length peripheral device transmission data I has a size of at least six bytes. As shown in Table 1, the fixed-bit-length peripheral device transmission data I contains six bytes B1~B6. The stored contents of the six bytes B1~B6 corresponding to the peripheral device raw input data R may be expressed as follows. That is, the first byte B1 is the byte representing the key pressing data BT_B, the second byte B2 is the lower byte representing the horizontal sensing displacement data LS_B, the higher nibble of the second byte B3 is the lower nibble representing the vertical sensing displacement data Y LS_N, the lower nibble of the second byte B3 is the higher nibble representing the horizontal sensing displacement data X MS_N, the fourth byte B4 is the higher byte representing the vertical sensing displacement data Y MS_B, the fifth byte B5 is the byte representing the wheel scrolling displacement data WR_B, and the sixth byte B6 is the byte representing the wheel tilting displacement data.

Consequently, whenever a key pressing operation is performed on the device main body 10 (or the device main body 10 is moved and the displacement is sensed, or the scroll wheel of the device main body 10 is scrolled/tilted), the first control unit 101 receives the corresponding peripheral device raw input data R. According to the fixed data transmission format conversion rule, the peripheral device raw input data R is converted into the fixed-bit-length peripheral device transmission data I with 6 bytes. Then, a network transmission packet P(I) containing the fixed-bit-length peripheral device transmission data I is generated by the first control unit 101. Then, the network transmission packet P(I) is outputted through the wireless transmission unit 102 in a wireless transmission manner.

The wireless receiver 11 is electrically connected with the computer host 12. The wireless receiver 11 comprises a second control unit 111 and a wireless receiving unit 112. The wireless receiving unit 112 is used to receive the network transmission packet P(I) containing the fixed-bit-length peripheral device transmission data I. The second control unit 111 directly extracts the fixed-bit-length peripheral device transmission data I from the network transmission packet P(I) and transmits the fixed-bit-length peripheral device transmission data I to the computer host 12.

FIG. 2 is a schematic timing waveform diagram illustrating the sequence of transmitting the network transmission packet P(I) containing the fixed-bit-length peripheral device transmission data I from the wireless transmission unit 102 and the sequence of outputting the fixed-bit-length peripheral device transmission data I from the second control unit 111 to the computer host 12.

For clearly describing the data transmission method, the transmission delay is ignored. Please refer to FIGS. 1 and 2. For example, the wireless transmission unit 102 sequentially transmits four network transmission packets $P_{11}(I_1) \sim P_{14}(I_4)$ containing four fixed-bit-length peripheral device transmission data $I_1 \sim I_4$ at a first transmission time interval $T_1$ (e.g., 8 ms). Theoretically, the second control unit 111 sequentially transmits the four fixed-bit-length peripheral device transmission data $I_1 \sim I_4$ at the first transmission time interval $T_1$ (e.g., 8 ms) to the computer host 12.

As mentioned above, whenever the key pressing operation is performed on the device main body 10 (or the device main body 10 is moved and the displacement is sensed, or the scroll wheel of the device main body 10 is scrolled/tilted), the corresponding peripheral device raw input data R generated by the device main body 10 is converted into the fixed-bit-length peripheral device transmission data I according to the fixed data transmission format conversion rule. In other words, regardless of the contents of the fixed-bit-length peripheral device transmission data I, each fixed-bit-length peripheral device transmission data I has the size of 6 bytes. Consequently, the device main body 10 needs to continuously transmit a lot of data to the wireless receiver 11. However, since a lot of electric power is needed during the wireless transmission, the power consumption of the built-in battery (not shown) in the device main body 10 is high.

In order to overcome the drawbacks of the conventional technologies, therefore, there is a need of providing an improved wireless peripheral device and an improved data transmission method for reducing the power consumption during the data transmission.

SUMMARY OF THE INVENTION

An object of the present invention provides a dynamic data transmission format adjustment method and a wireless peripheral device using the method in order to effectively reducing the power consumption during wireless transmission.

In accordance with an aspect of the present invention, a dynamic data transmission format adjustment method is used between a computer host and a wireless peripheral device. The dynamic data transmission format adjustment method at least includes the following steps. In a step (a), a peripheral device raw input data is acquired from a device main body of the wireless peripheral device. In a step (b), the peripheral device raw input data is converted into a variable-bit-length peripheral device transmission data according to a dynamic data transmission format conversion rule. In a step (c), a network transmission packet containing the variable-bit-length peripheral device transmission data is generated, and the network transmission packet is transmitted to a wireless receiver of the wireless peripheral device. In a step (d), the variable-bit-length peripheral device transmission data in the network transmission packet is converted and restored into a fixed-bit-length peripheral device transmission data according to the dynamic data transmission format conversion rule. In a step (e), the fixed-bit-length peripheral device transmission data is transmitted from the wireless receiver to the computer host. A size of the variable-bit-length peripheral device transmission data is 1 byte or plural bytes. The variable-bit-length peripheral device transmission data at least contains a key pressing data, or the variable-bit-length peripheral device transmission data is a combination of the key pressing data and at least one of a wheel displacement data and a sensing displacement data.

In an embodiment, the key pressing data at least contains a left key pressing data, a middle key pressing data and a right key pressing data, or the key pressing data at least contains the left key pressing data, the middle key pressing data, the right key pressing data and at least one extension key pressing data. The wheel displacement data at least contains at least one of a wheel scrolling displacement data and a wheel tilting displacement data, or the sensing displacement data at least contains a horizontal sensing displacement data and a vertical sensing displacement data.

In an embodiment, the size of the variable-bit-length peripheral device transmission data is not larger than a size of the fixed-bit-length peripheral device transmission data.

In an embodiment, the size of the variable-bit-length peripheral device transmission data is 1 byte, 2 bytes, 3 bytes, 4 bytes or 5 bytes, and the size of the fixed-bit-length peripheral device transmission data is at least 6 bytes.

In an embodiment, according to the dynamic data transmission format conversion rule, a first byte of the variable-bit-length peripheral device transmission data contains a format type code and the key pressing data. Moreover, according to the dynamic data transmission format conversion rule, other bytes of the variable-bit-length peripheral device transmission data contain the at least one of the wheel displacement data and the sensing displacement data.

In an embodiment, the format type code represents at least eight types of data transmission formats. In a first one of the eight types of data transmission formats, the variable-bit-length peripheral device transmission data contains the key pressing data only. In others of the eight types of data transmission formats, the variable-bit-length peripheral device transmission data contains the combination of the key pressing data and the at least one of the wheel displacement data and the sensing displacement data.

Preferably, in the step (a), the peripheral device raw input data and an additional peripheral device raw input data are consecutively acquired. In the step (b), the peripheral device raw input data and the additional peripheral device raw input data are consecutively converted into the variable-bit-length peripheral device transmission data and an additional variable-bit-length peripheral device transmission data according to the data transmission format dynamic conversion rule. In the step (c), a network transmission packet containing the variable-bit-length peripheral device transmission data and an additional network transmission packet containing the additional variable-bit-length peripheral device transmission data are sequentially generated, and the network transmission packet and the additional network transmission packet are sequentially transmitted from the device main body to the wireless receiver at a first transmission time interval.

In an embodiment, in the step (d), the variable-bit-length peripheral device transmission data and the additional variable-bit-length peripheral device transmission data are respectively retrieved from the network transmission packet and the additional network transmission packet by the wireless receiver, and the variable-bit-length peripheral device transmission data and the additional variable-bit-length peripheral device transmission data are converted and restored into the fixed-bit-length peripheral device transmission data and the additional fixed-bit-length peripheral device transmission data according to the data transmission format dynamic conversion rule. In the step (e), the fixed-bit-length peripheral device transmission data and the additional fixed-bit-length peripheral device transmission data are sequentially transmitted to the computer host at the first transmission time interval.

In an embodiment, in the step (a), the peripheral device raw input data and an additional peripheral device raw input data are consecutively acquired. In the step (b), the peripheral device raw input data and the additional peripheral device raw input data are consecutively converted into the variable-bit-length peripheral device transmission data and an additional variable-bit-length peripheral device transmission data according to the data transmission format dynamic conversion rule. In the step (c), the variable-bit-length peripheral device transmission data and the additional variable-bit-length peripheral device transmission data are combined as a combined network transmission packet by the device main body, and the combined network transmission packet is transmitted from the device main body to the wireless receiver at a second transmission time interval. The second transmission time interval is an integer multiple of a first transmission time interval.

Preferably, in the step (d), the variable-bit-length peripheral device transmission data and the additional variable-bit-length peripheral device transmission data are retrieved from the combined network transmission packet by the wireless receiver, and the variable-bit-length peripheral device transmission data and the additional variable-bit-length peripheral device transmission data are respectively converted and restored into the fixed-bit-length peripheral device transmission data and the additional fixed-bit-length peripheral device transmission data according to the data transmission format dynamic conversion rule. In the step (e), the fixed-bit-length peripheral device transmission data and the additional fixed-bit-length peripheral device transmission data are sequentially transmitted to the computer host at the first transmission time interval.

In an embodiment, in the step (c), if the device main body judges that the key pressing data in the variable-bit-length peripheral device transmission data and the key pressing data in the additional variable-bit-length peripheral device transmission data are identical and the sensing displacement data in the variable-bit-length peripheral device transmission data and the sensing displacement data in the additional variable-bit-length peripheral device transmission data are different, the variable-bit-length peripheral device transmission data and the additional variable-bit-length peripheral device transmission data are combined as the combined network transmission packet by the device main body, and the combined network transmission packet is transmitted from the device main body to the wireless receiver after the second transmission time interval.

In accordance with another aspect of the present invention, a wireless peripheral device is provided. The wireless peripheral device is electrically connected with a computer host. The wireless peripheral device includes a device main body and a wireless receiver. The device main body includes a first control unit and a wireless transmission unit. After the first control unit acquires a peripheral device raw input data, the peripheral device raw input data is converted into a fixed-bit-length peripheral device transmission data by the first control unit according to a dynamic data transmission format conversion rule. After a network transmission packet containing the variable-bit-length peripheral device transmission data is generated by the first control unit, the network transmission packet is outputted through the wireless transmission unit. The wireless receiver is electrically connected with the computer host. The wireless receiver includes a second control unit and a wireless receiving unit.

After the wireless receiving receives the network transmission packet, the variable-bit-length peripheral device transmission data in the network transmission packet is converted and restored into a fixed-bit-length peripheral device transmission data by the second control unit according to the dynamic data transmission format conversion rule, and the fixed-bit-length peripheral device transmission data is transmitted from the second control unit to the computer host. A size of the variable-bit-length peripheral device transmission data is 1 byte or plural bytes. Moreover, the variable-bit-length peripheral device transmission data at least contains a key pressing data, or the variable-bit-length peripheral device transmission data is a combination of the key pressing data and at least one of a wheel displacement data and a sensing displacement data.

In an embodiment, the key pressing data at least contains a left key pressing data, a middle key pressing data and a right key pressing data, or the key pressing data at least contains the left key pressing data, the middle key pressing data, the right key pressing data and at least one extension key pressing data. The wheel displacement data at least contains at least one of a wheel scrolling displacement data and a wheel tilting displacement data, or the sensing displacement data at least contains a horizontal sensing displacement data and a vertical sensing displacement data.

In an embodiment, the size of the variable-bit-length peripheral device transmission data is not larger than a size of the fixed-bit-length peripheral device transmission data.

In an embodiment, the size of the variable-bit-length peripheral device transmission data is 1 byte, 2 bytes, 3 bytes, 4 bytes or 5 bytes, and the size of the fixed-bit-length peripheral device transmission data is at least 6 bytes.

In an embodiment, according to the dynamic data transmission format conversion rule, a first byte of the variable-bit-length peripheral device transmission data contains a format type code and the key pressing data. Moreover, according to the dynamic data transmission format conversion rule, other bytes of the variable-bit-length peripheral device transmission data contains the at least one of the wheel displacement data and the sensing displacement data.

In an embodiment, the format type code represents at least eight types of data transmission formats. In a first one of the eight types of data transmission formats, the variable-bit-length peripheral device transmission data contains the key pressing data only. In others of the eight types of data transmission formats, the variable-bit-length peripheral device transmission data contains the combination of the key pressing data and the at least one of the wheel displacement data and the sensing displacement data.

In an embodiment, after the peripheral device raw input data and an additional peripheral device raw input data are consecutively acquired by the first control unit, the peripheral device raw input data and the additional peripheral device raw input data are consecutively converted into the variable-bit-length peripheral device transmission data and an additional variable-bit-length peripheral device transmission data according to the data transmission format dynamic conversion rule. After the network transmission packet containing the variable-bit-length peripheral device transmission data and an additional network transmission packet containing the additional variable-bit-length peripheral device transmission data are sequentially generated, the network transmission packet and the additional network transmission packet are sequentially transmitted from the first control unit to the wireless receiver through the wireless transmission unit at a first transmission time interval.

In an embodiment, after the peripheral device raw input data and an additional peripheral device raw input data are consecutively acquired by the first control unit, the peripheral device raw input data and the additional peripheral device raw input data are consecutively converted into the variable-bit-length peripheral device transmission data and an additional variable-bit-length peripheral device transmission data according to the data transmission format dynamic conversion rule. After the variable-bit-length peripheral device transmission data and the additional variable-bit-length peripheral device transmission data are combined as a combined network transmission packet by the first control unit, the combined network transmission packet is transmitted from the first control unit to the wireless receiver through the wireless transmission unit at a second transmission time interval. The second transmission time interval is an integer multiple of a first transmission time interval.

In an embodiment, after the combined network transmission packet is received by the wireless receiving unit, the variable-bit-length peripheral device transmission data and the additional variable-bit-length peripheral device transmission data in the combined network transmission packet are respectively retrieved by the second control unit, and the variable-bit-length peripheral device transmission data and the additional variable-bit-length peripheral device transmission data are converted and restored into the fixed-bit-length peripheral device transmission data and the additional fixed-bit-length peripheral device transmission data according to the data transmission format dynamic conversion rule. The fixed-bit-length peripheral device transmission data and the additional fixed-bit-length peripheral device transmission data are sequentially transmitted to the computer host at the first transmission time interval.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. In the following embodiments and drawings, the elements irrelevant to the concepts of the present invention are omitted and not shown.

Figure 1:
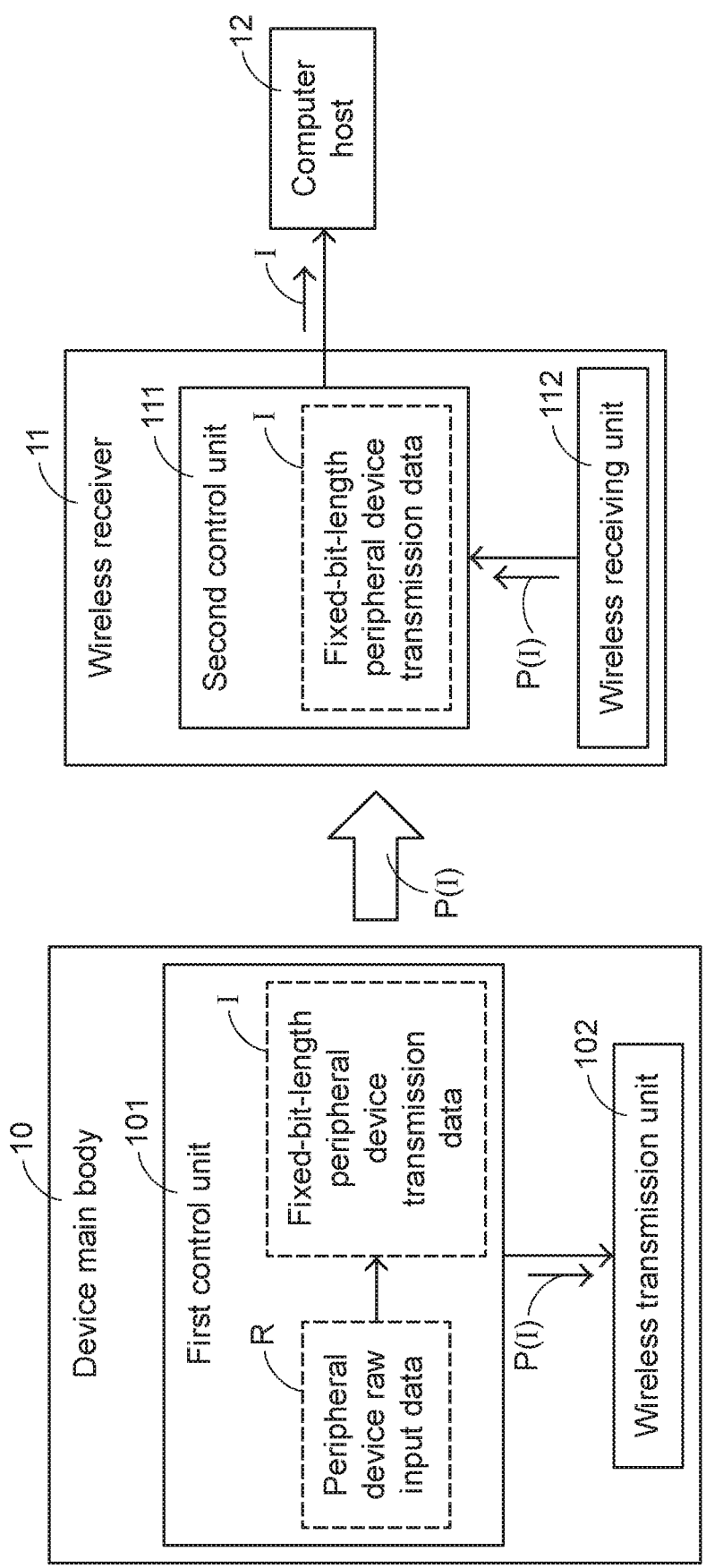
FIG. 1 is a schematic functional block diagram illustrating the data transmission between a conventional wireless peripheral device and a computer host.
Figure 2:
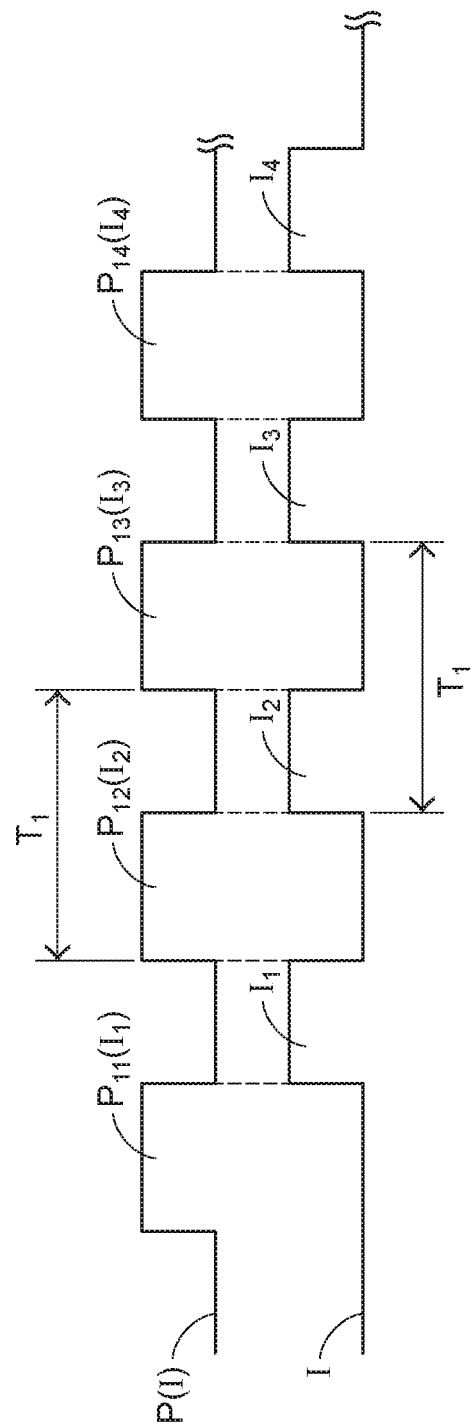
FIG. 2 is a schematic timing waveform diagram illustrating the sequence of transmitting the network transmission packet containing the fixed-bit-length peripheral device transmission data from the wireless transmission unit and the sequence of outputting the fixed-bit-length peripheral device transmission data from the second control unit to the computer host.
Figure 3A:
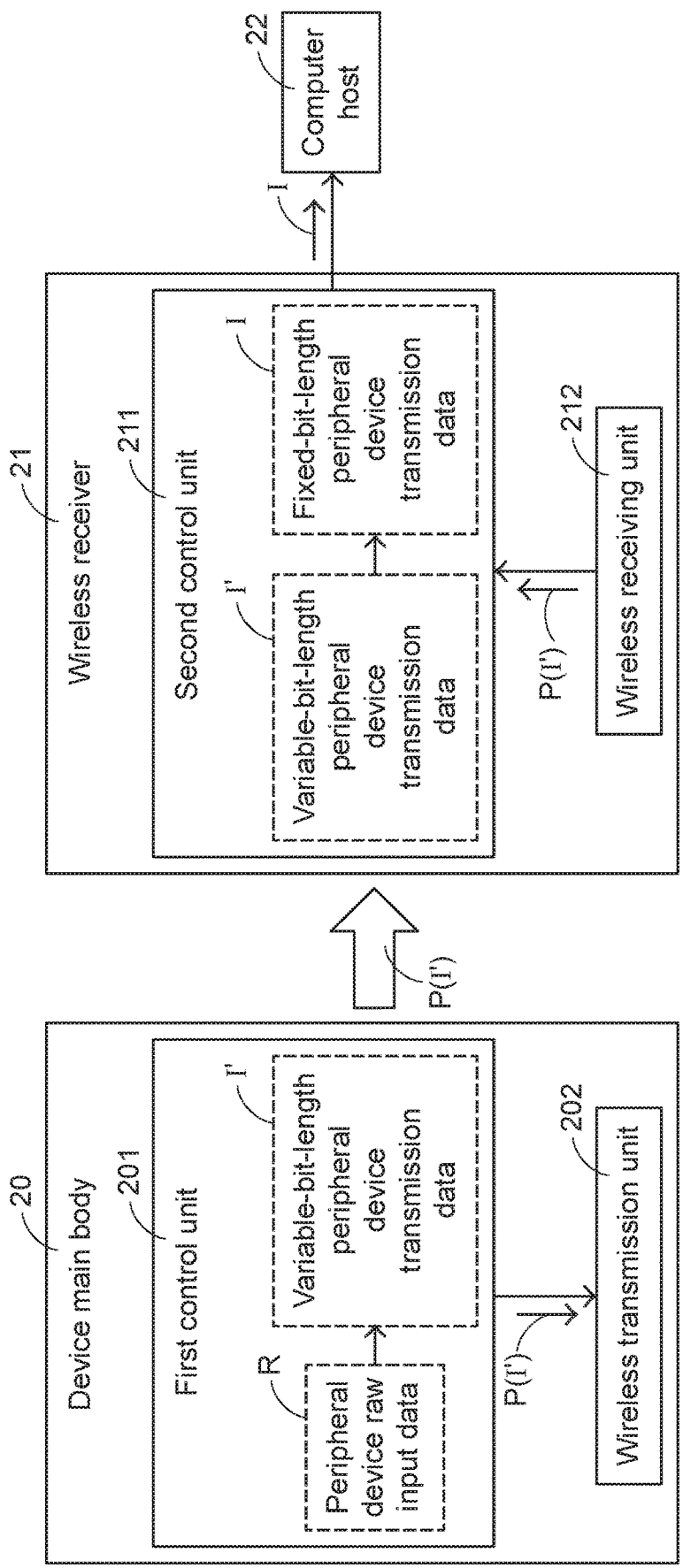
FIG. 3A is a schematic functional block diagram illustrating the operation between a wireless peripheral device and a computer host according to the present invention.

FIG. 3A is a schematic functional block diagram illustrating the operation between a wireless peripheral device and a computer host according to the present invention. The wireless peripheral device comprises a device main body 20 (e.g., a wireless mouse body) and a wireless receiver 21 (e.g., a USB-type wireless mouse receiver). The device main body 20 and the wireless receiver 21 are in communication with each other in a wireless transmission manner. Moreover, the wireless receiver 21 is electrically connected with a computer host 22 in a wired transmission manner.

The device main body 20 comprises a first control unit 201 and a wireless transmission unit 202. The first control unit 101 is used to receive a peripheral device raw input data R. In addition, the peripheral device raw input data R is converted into a variable-bit-length peripheral device transmission data I' by the first control unit 101 according to a dynamic data transmission format conversion rule. In case that the wireless peripheral device is a wireless mouse, the peripheral device raw input data R contains a key pressing data, a sensing displacement data (including a horizontal sensing displacement data and a vertical sensing displacement data) and a wheel displacement data (including a wheel scrolling displacement data and a wheel tilting displacement data).

Then, a network transmission packet P(I') containing the variable-bit-length peripheral device transmission data I' is generated by the first control unit 201. In addition, the network transmission packet P(I') is outputted through the wireless transmission unit 202.

The wireless receiver 21 is electrically connected with the computer host 22. The wireless receiver 21 comprises a second control unit 211 and a wireless receiving unit 212. The wireless receiving unit 212 is used to receive the network transmission packet P(I') containing the variable-bit-length peripheral device transmission data I'. After the second control unit 211 extracts the variable-bit-length peripheral device transmission data I' from the network transmission packet P(I'), the variable-bit-length peripheral device transmission data I' is converted and restored into a fixed-bit-length peripheral device transmission data I according to the dynamic data transmission format conversion rule. Then, the fixed-bit-length peripheral device transmission data I is transmitted to the computer host 22 through the wireless transmission unit 202.

When a key pressing operation is performed on the device main body 20 (or the device main body 20 is moved and the displacement is sensed, or the scroll wheel of the device main body 20 is scrolled/tilted), the number of information contained in the peripheral device raw input data R may be different. In accordance with the feature of the present invention, the peripheral device raw input data R is converted into the variable-bit-length peripheral device transmission data I', and the size of the variable-bit-length peripheral device transmission data I' is determined according to the type of the data to be transmitted. For example, in the simplest situation, the peripheral device raw input data R contains the key pressing data only. In a complicated situation, the peripheral device raw input data R contains the key pressing data and the horizontal sensing displacement data (or the vertical sensing displacement data), and the size of the peripheral device raw input data R is equal to 1.5 byte (or 12 bits). In a complicated situation, the peripheral device raw input data R contains the key pressing data, the horizontal sensing displacement data, the vertical sensing displacement data, the wheel scrolling displacement data and a wheel tilting displacement data, and the size of the peripheral device raw input data R is the largest. According to different situations, the variable-bit-length peripheral device transmission data I' corresponding to the peripheral device raw input data R is generated. Consequently, the power consumption of wirelessly transmitting data through the wireless transmission unit 202 is effectively reduced.

As mentioned above, after the second control unit 211 acquires the variable-bit-length peripheral device transmission data I', the variable-bit-length peripheral device transmission data I' is converted and restored into a fixed-bit-length peripheral device transmission data I according to the dynamic data transmission format conversion rule, and then the fixed-bit-length peripheral device transmission data I is transmitted to the computer host 22. In other words, the fixed-bit-length peripheral device transmission data I received by the computer host 22 has the same format as the conventional technology. Since the fixed-bit-length peripheral device transmission data I is able to be recognized and utilized by the computer host 22, the computer host 22 can accurately perform an operation in response to the control behavior of the device main body 20. Moreover, the power consumption of the battery in the device main body 20 is reduced according to the technology of the present invention. Consequently, the drawbacks of the conventional technology can be effectively solved.

The dynamic data transmission format conversion rule is a rule for converting the peripheral device raw input data R into the variable-bit-length peripheral device transmission data I' according to the dynamic conversion and storage strategy as shown in Table 2.

S4 and a fifth extension key pressing data S5. The contents of the key pressing data are listed in Table 2 for illustration later. It is noted that the contents of the key pressing data are not restricted.

In addition, during the wireless transmission, the size of the variable-bit-length peripheral device transmission data I' is 1 byte, 2 bytes, 3 bytes, 4 bytes or 5 bytes. That is, the contents of the variable-bit-length peripheral device transmission data I' contain at least one of a first byte B1, a second byte B2, a third byte B3, a fourth byte B4 and a fifth byte B5. Moreover, according to the contents of the peripheral device raw input data R, there are eight types of data transmission formats.

Please refer to the dynamic data transmission format conversion rule of Table 2 again. In the first byte B1 of the variable-bit-length peripheral device transmission data I', eight types of data transmission formats are defined by eight format type codes composed of three bits B18, B17 and B16. That is, the eight format type codes include "000", "001", "010", "011", "100", "101", "110" and "111". Moreover, the five bits B15, B14, B13, B12 and B11 in the first byte B1 of the variable-bit-length peripheral device transmission data I' represent the left key pressing data L, the middle key pressing data M, the left key pressing data R, the fourth extension key pressing data S4 and the fifth extension key pressing data S5 of the key pressing data, respectively.

In the first type of data transmission format, the variable-bit-length peripheral device transmission data I' contains the key pressing data (S5, S4, M, R, L). In each of the second, third, fourth, fifth, sixth, seventh and eighth types of data transmission formats, the variable-bit-length peripheral device transmission data I' contains the key pressing data (S5, S4, M, R, L) and at least one of the wheel displacement data and the sensing displacement data.

Among the eight types of data transmission formats, the variable-bit-length peripheral device transmission data I' with the data transmission format corresponding to the format type code "000" of the first byte B1 has the smallest size (i.e., containing the first byte B1). Among the eight types of data transmission formats, the variable-bit-length peripheral device transmission data I' with the data transmission format corresponding to the format type code "101" or "110" of the first byte B1 has the largest size (i.e., containing the first byte B1, the second byte B2, the third byte B3, the fourth byte B4 and the fifth byte B5). Moreover, the variable-bit-length peripheral device transmission data I'

TABLE 2

| | | | | | | | | | |
|---|---|---|---|---|---|---|---|---|---|
| B1 | B18 | 0 | 0 | 0 | 0 | 1 | 1 | 1 | 1 |
| | B17 | 0 | 0 | 1 | 1 | 0 | 0 | 1 | 1 |
| | B16 | 0 | 1 | 0 | 1 | 0 | 1 | 0 | 1 |
| | B15 | S5 | S5 | S5 | S5 | S5 | S5 | S5 | S5 |
| | B14 | S4 | S4 | S4 | S4 | S4 | S4 | S4 | S5 |
| | B13 | M | M | M | M | M | M | M | M |
| | B12 | R | R | R | R | R | R | R | R |
| | B11 | L | L | L | L | L | L | L | L |
| B2 | H_N | N/A | T | Y | Y | X LS_B | X LS_B | X1_B | X_B |
| | L_N | | W | X | X | | | | |
| B3 | H_N | | N/A | N/A | T | Y LS_N | Y LS_N | Y1_B | Y_B |
| | L_N | | | | W | X MS_N | X MS_N | | |
| B4 | H_N | | | N/A | Y MS_B | Y MS_B | X2_B | T | |
| | L_N | | | | | | | | W |
| B5 | H_N | | | | N/A | T | Y2_B | N/A | |
| | L_N | | | | | W | | | |

In this embodiment, the key pressing data at least contains a left key pressing data L, a middle key pressing data M, a left key pressing data R, a fourth extension key pressing data with the data transmission format corresponding to the format type code "001" or "010" of the first byte B1 contains the first byte B1 and the second byte B2. Moreover, the variable-bit-length peripheral device transmission data I' with the data transmission format corresponding to the format type code "011" of the first byte B1 contains the first byte B1, the second byte B2 and the third byte B3. Moreover, the variable-bit-length peripheral device transmission data I' with the data transmission format corresponding to the format type code "100" or "111" of the first byte B1 contains the first byte B1, the second byte B2, the third byte B3 and the fourth byte B4.

Please refer to Table 2 again. In each of the eight types of data transmission formats, the variable-bit-length peripheral device transmission data I' at least contains the first byte B1. Consequently, when each variable-bit-length peripheral device transmission data I' is transmitted to the receiving terminals such as the wireless receiver 21 and the computer host 22, the receiving terminals can realize the key pressing state of the device main body 20 corresponding to any key pressing data in real time. Consequently, even if one or some network transmission packets are lost, the state of the key pressing data can still be effectively recognized.

In the other types of data transmission formats, the variable-bit-length peripheral device transmission data I' with the data transmission format corresponding to the format type code "001", "010", "011", "100", "101", "110" or "111" comprises the first byte B1 and at least one the second byte B2, the third byte B3, the fourth byte B4 and the fifth byte B5. In the second byte B2, the third byte B3, the fourth byte B4 and the fifth byte B5, the conversion data corresponding to at least one of the sensing displacement data and the wheel displacement data of the peripheral device raw input data R is contained.

The stored contents of the five bytes B1~B5 listed in Table 2 are expressed as follows. That is, H_N represents the higher nibble in each of the bytes B2~B5, L_N representsg the lower nibble in each of the byte B2~B5, N/A represents the byte of the data transmission format that is not applicable, T represents a nibble of the wheel scrolling displacement data, W represents a nibble of the wheel tilting displacement data, X represents a nibble of the horizontal sensing displacement data, X1_B represents the byte of the first horizontal sensing displacement data, X2_B represents the byte of the second horizontal sensing displacement data, X_B represents the byte of the horizontal sensing displacement data, X LS_B represents the lower nibble of the horizontal sensing displacement data, X MS_N represents the higher nibble of the horizontal sensing displacement data, Y represents a nibble of the vertical sensing displacement data, Y1_B represents the byte of the first vertical sensing displacement data, Y2_B represents the byte of the second vertical sensing displacement data, Y_B represents the byte of the vertical sensing displacement data, Y LS_N represents the lower nibble of the vertical sensing displacement data, and Y MS_B represents the higher byte of the vertical sensing displacement data.

Figure 3B:
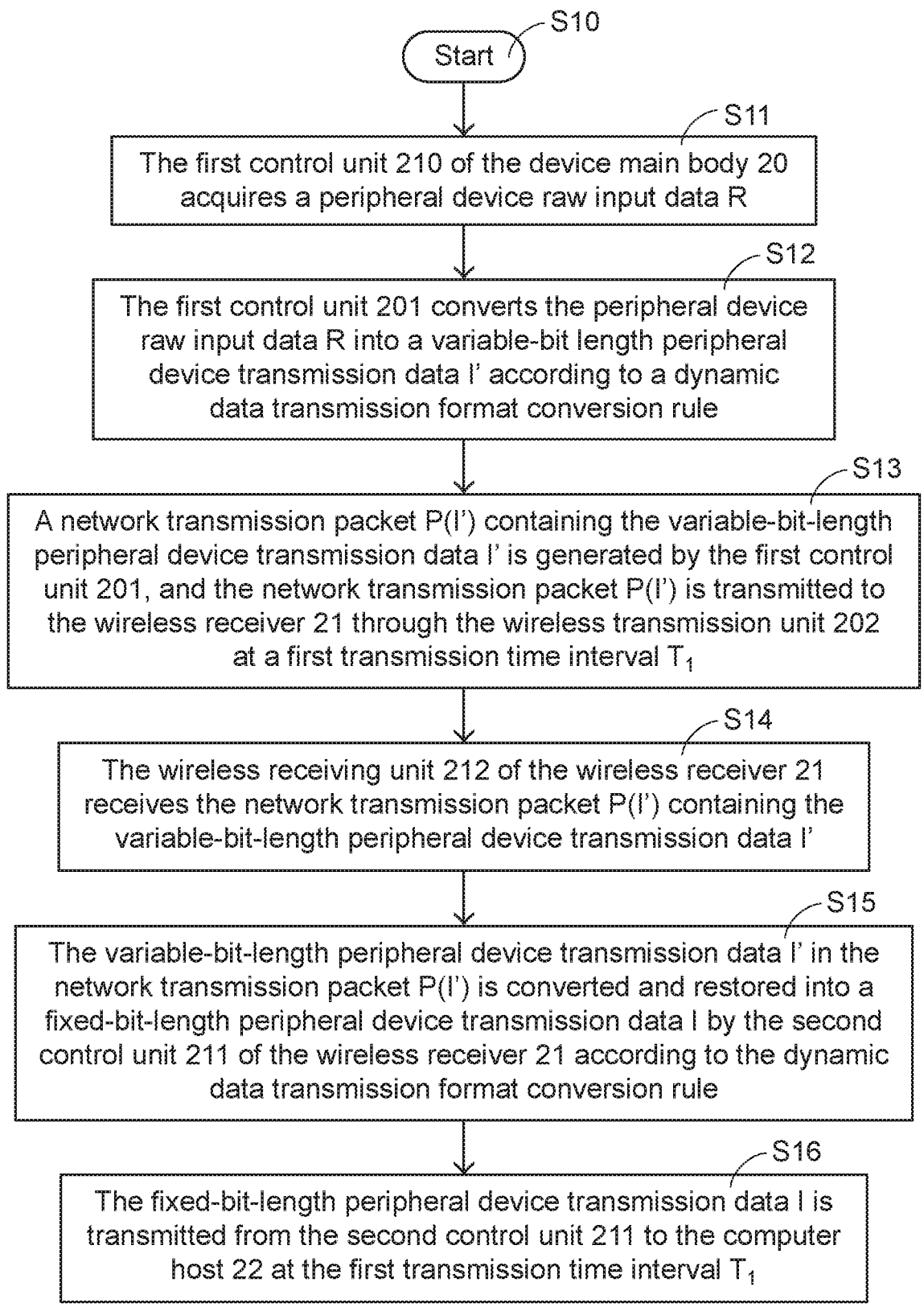
FIG. 3B is a flowchart illustrating a dynamic data transmission format adjustment method according to a first embodiment of the present invention.

FIG. 3B is a flowchart illustrating a dynamic data transmission format adjustment method according to a first embodiment of the present invention. The method can be applied to the data transmission system as shown in FIG. 3A.

Firstly, in a step S10, the method is started.

Then, in a step S11, the first control unit 210 of the device main body 20 acquires a peripheral device raw input data R.

Then, in a step S12, the first control unit 201 converts the peripheral device raw input data R into a variable-bit length peripheral device transmission data I' according to a dynamic data transmission format conversion rule.

Then, in a step S13, a network transmission packet P(I') containing the variable-bit-length peripheral device transmission data I' is generated by the first control unit 201. In addition, the network transmission packet P(I') is transmitted to the wireless receiver 21 through the wireless transmission unit 202 at a first transmission time interval $T_1$.

Then, in a step S14, the wireless receiving unit 212 of the wireless receiver 21 receives the network transmission packet P(I') containing the variable-bit-length peripheral device transmission data I'.

Then, in a step S15, the variable-bit-length peripheral device transmission data I' in the network transmission packet P(I') is converted and restored into a fixed-bit-length peripheral device transmission data I by the second control unit 211 of the wireless receiver 21 according to the dynamic data transmission format conversion rule.

Then, in a step S16, the fixed-bit-length peripheral device transmission data I is transmitted from the second control unit 211 to the compute host 22 at the first transmission time interval $T_1$.

Figure 4:
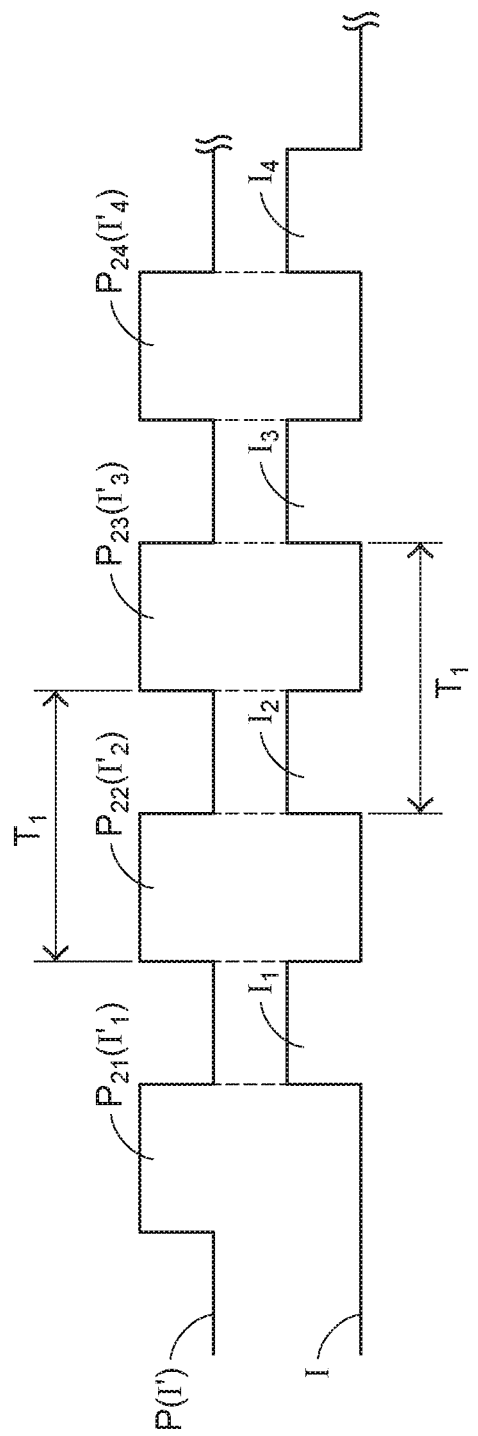
FIG. 4 is a schematic timing waveform diagram illustrating the sequence of transmitting the network transmission packet containing the variable-bit-length peripheral device transmission data from the wireless transmission unit as shown in FIG. 3A and the sequence of outputting the fixed-bit-length peripheral device transmission data from the second control unit to the computer host.

FIG. 4 is a schematic timing waveform diagram illustrating the sequence of transmitting the network transmission packet P(I') containing the variable-bit-length peripheral device transmission data I' from the wireless transmission unit 202 as shown in FIG. 3A and the sequence of outputting the fixed-bit-length peripheral device transmission data I from the second control unit 211 to the computer host 22.

For clearly describing the data transmission method, the transmission delay is ignored. Please refer to FIGS. 3A and 4. For example, the wireless transmission unit 202 sequentially transmits four network transmission packets P21(I'$_1$) ~P24(I'$_4$) containing four variable-bit-length peripheral device transmission data I'$_1$~I'$_4$ at a first transmission time interval $T_1$ (e.g., 8 ms). Theoretically, the second control unit 211 sequentially transmits the four fixed-bit-length peripheral device transmission data $I_1$~$I_4$ to the computer host 22 at the first transmission time interval $T_1$ (e.g., 8 ms).

In the above embodiment, the amount of data to be transmitted is dynamically adjusted, and thus the power consumption of the battery in the device main body 20 is reduced. On the basis of the concepts of the above embodiment, the technology of the present invention can be further improved. In another embodiment, the timing of transmitting data by the device main body 20 is improved or the number of the data packets is reduced. Consequently, the power consumption of the device main body 20 can be further reduced.

Figure 5A:
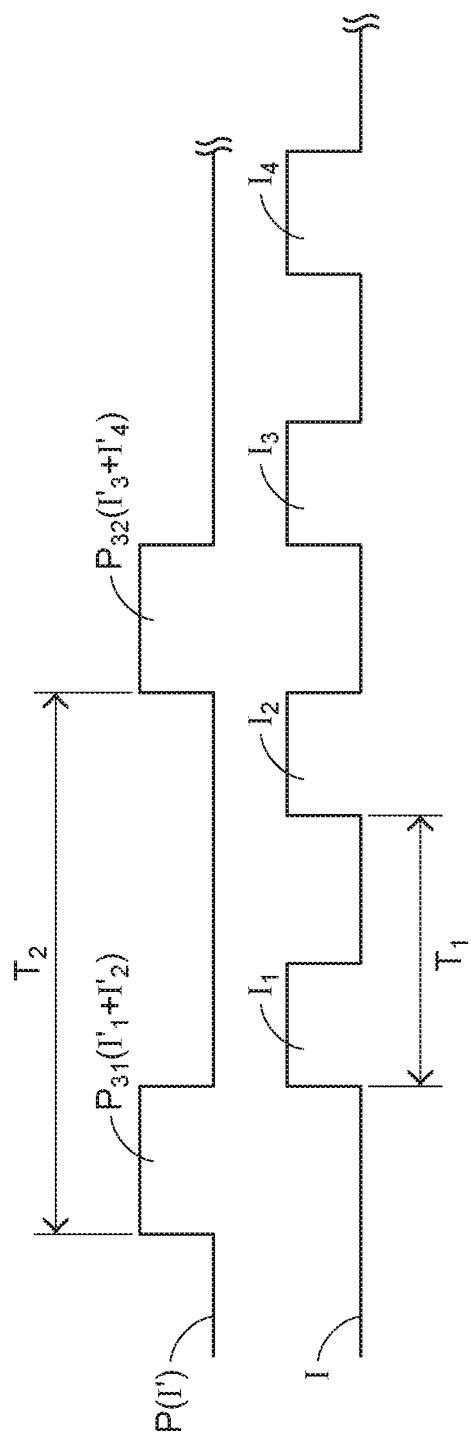
FIG. 5A is a schematic timing waveform diagram illustrating the sequence of transmitting the network transmission packet containing the two variable-bit-length peripheral device transmission data from the wireless transmission unit as shown in FIG. 3A and the sequence of outputting the fixed-bit-length peripheral device transmission data from the second control unit to the computer host.

Please refer to FIGS. 3 and 5A. FIG. 5A is a schematic timing waveform diagram illustrating the sequence of transmitting the network transmission packet P(I') containing the two variable-bit-length peripheral device transmission data I' from the wireless transmission unit 202 as shown in FIG. 3A and the sequence of outputting the fixed-bit-length peripheral device transmission data I from the second control unit 211 to the computer host 22 according to another embodiment of the present invention.

For clearly describing the data transmission method, the transmission delay is ignored. The first control unit 201 acquires two consecutive peripheral device raw input data R1 and R2 (or R3 and R4) sequentially. Then, the first control unit 201 converts the two consecutive peripheral device raw input data R1 and R2 (or R3 and R4) into two consecutive variable-bit-length peripheral device transmission data I'$_1$ and I'$_2$ (or I'$_3$ and I'$_4$) according to the dynamic data transmission format conversion rule as shown in Table 2. Then, the two consecutive variable-bit-length peripheral device transmission data I'$_1$ and I'$_2$ (or I'$_3$ and I'$_4$) are combined as a combined network transmission packet P$_{31}$(I'$_1$+I'$_2$) (or P$_{32}$(I'$_3$+I'$_4$)) by the first control unit 201. In addition, the first control unit 201 transmits the combined network transmission packet $P_{31}(I'_1+I'_2)$ (or $P_{32}(I'_3+I'_4)$) to the wireless receiver 21 through the wireless transmission unit 202 at a second transmission time interval $T_2$. The second transmission time interval $T_2$ is the integer multiple of the first transmission time interval $T_1$. For example, the second transmission time interval $T_2$ is 16 ms.

After the two combined network transmission packets $P_{31}(I'_1+I'_2)$ and $P_{32}(I'_3+I'_4)$ are sequentially received by the wireless receiving unit 212, the second control unit 211 retrieves the variable-bit-length peripheral device transmission data $I'_1$ and $I'_2$ from the combined network transmission packet $P_{31}(I'_1+I'_2)$ and retrieves the variable-bit-length peripheral device transmission data $49'_3$ and $1'_4$ from the combined network transmission packet $P_{32}(I'_3+I'_4)$. According to the dynamic data transmission format conversion rule as shown in Table 2, the variable-bit-length peripheral device transmission data $I'_1$, $I'_2$, $I'_3$ and $I'_4$ are converted and restored into consecutive fixed-bit-length peripheral device transmission data $I_1$, $I_2$, $I_3$ and $I_4$, sequentially. Moreover, the fixed-bit-length peripheral device transmission data $I_1$, $I_2$, $I_3$ and $I_4$ are sequentially transmitted to the computer host 22 at the first transmission time interval $T_1$.

Figure 5B:
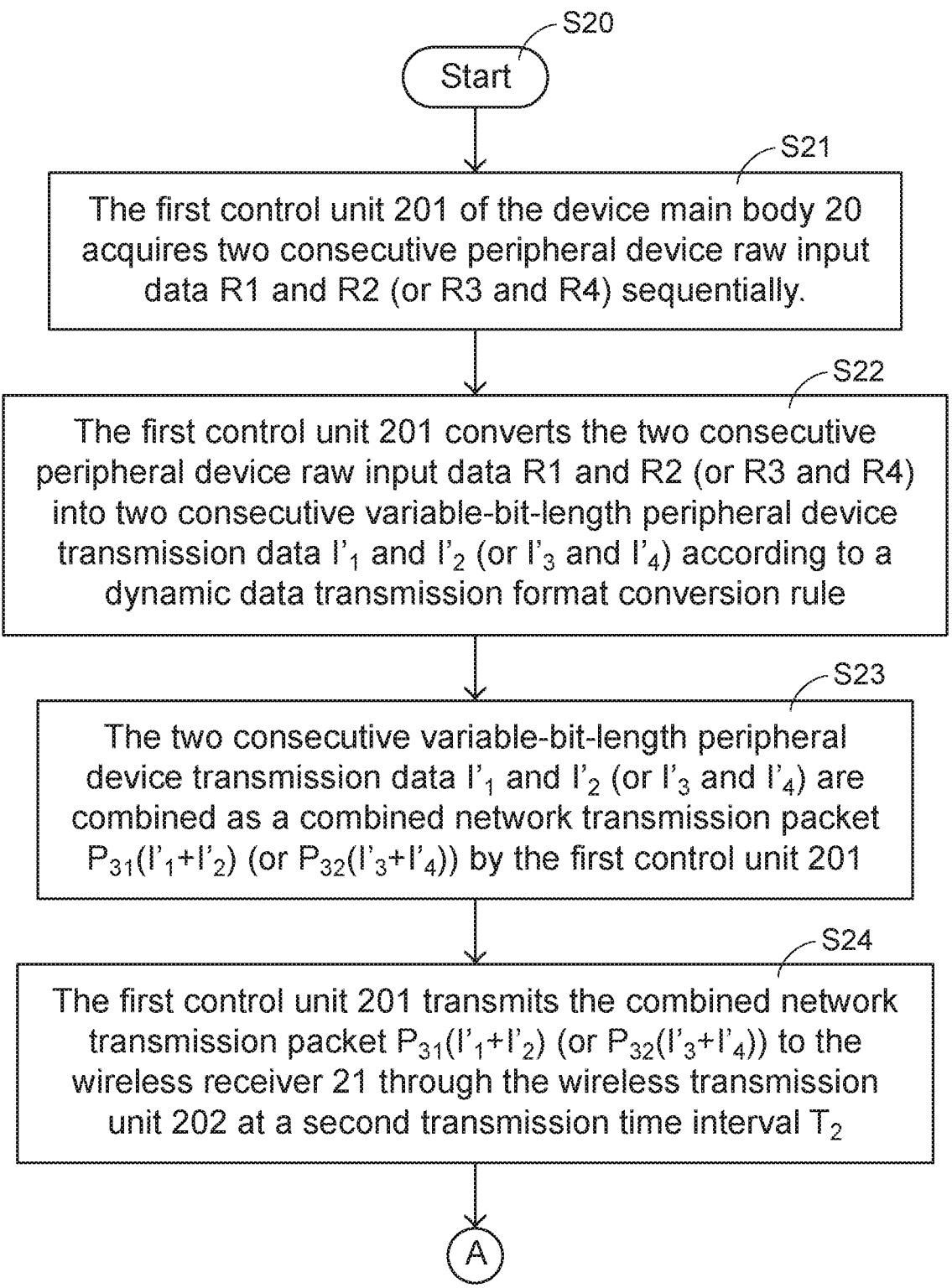
FIGS. 5B and 5C illustrate a flowchart of a dynamic data transmission format adjustment method according to a second embodiment of the present invention.
Figure 5C:
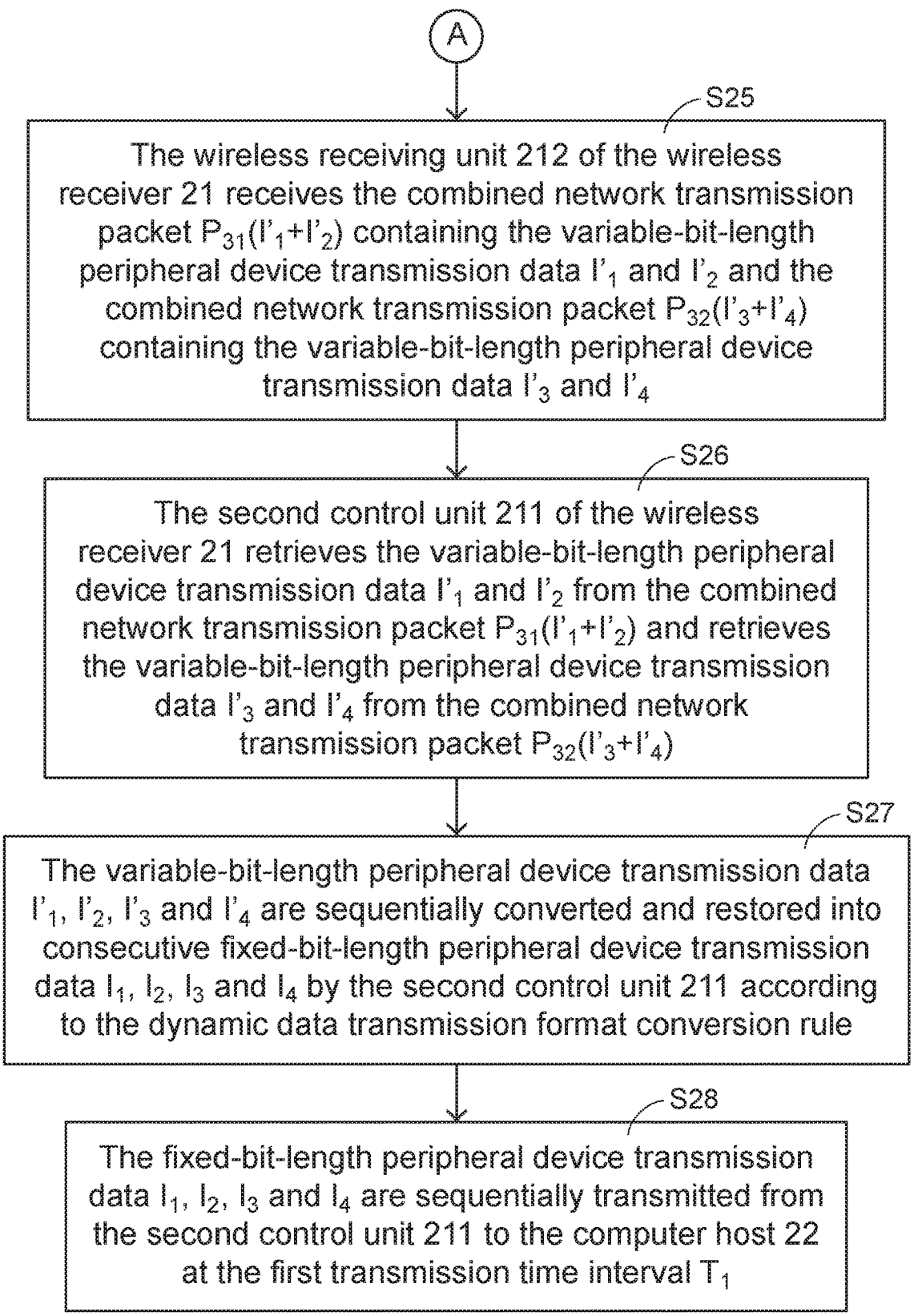

FIGS. 5B and 5C illustrate a flowchart of a dynamic data transmission format adjustment method according to a second embodiment of the present invention. The method can be applied to the data transmission system as shown in FIG. 5A.

Firstly, in a step S20, the method is started.

Then, in a step S21, the first control unit 201 of the device main body 20 acquires two consecutive peripheral device raw input data R1 and R2 (or R3 and R4) sequentially.

Then, in a step S22, the first control unit 201 converts the two consecutive peripheral device raw input data R1 and R2 (or R3 and R4) into two consecutive variable-bit-length peripheral device transmission data I' 1 and $49'_2$ (or $49'_3$ and $I'_4$) according to a dynamic data transmission format conversion rule.

Then, in a step S23, the two consecutive variable-bit-length peripheral device transmission data $I'_1$ and $I'_2$ (or $49'_3$ and $I'_4$) are combined as a combined network transmission packet $P_{31}(I'_1+I'_2)$ (or $P_{32}(I'_3+I'_4)$) by the first control unit 201.

Then, in a step S24, the first control unit 201 transmits the combined network transmission packet $P_{31}(I'_1+I'_2)$ (or $P_{32}(I'_3+I'_4)$) to the wireless receiver 21 through the wireless transmission unit 202 at a second transmission time interval $T_2$.

Then, in a step S25, the wireless receiving unit 212 of the wireless receiver 21 receives the combined network transmission packet $P_{31}(I'_1+I'_2)$ containing the variable-bit-length peripheral device transmission data $I'_1$ and $I'_2$ and the combined network transmission packet $P_{32}(I'_3+I'_4)$ containing the variable-bit-length peripheral device transmission data $I'_3$ and Then, in a step S26, the second control unit 211 of the wireless receiver 21 retrieves the variable-bit-length peripheral device transmission data $I'_1$ and $I'_2$ from the combined network transmission packet $P_{31}(I'_1+I'_2)$ and retrieves the variable-bit-length peripheral device transmission data $49'_3$ and $I'_4$ from the combined network transmission packet $P_{32}(I'_3+I'_4)$.

Then, in a step S27, the variable-bit-length peripheral device transmission data $I'_1$, $I'_2$, $I'_3$ and $I'_4$ are sequentially converted and restored into consecutive fixed-bit-length peripheral device transmission data $I_1$, $I_2$, $I_3$ and $I_4$ by the second control unit 211 according to the dynamic data transmission format conversion rule.

Then, in a step S28, the fixed-bit-length peripheral device transmission data $I_1$, $I_2$, $I_3$ and $I_4$ are sequentially transmitted from the second control unit 211 to the computer host 22 at the first transmission time interval $T_1$.

In the embodiment of FIGS. 5A, 5B and 5C, the two consecutive variable-bit-length peripheral device transmission data $I'_1$ and $I'_2$ (or $I'_3$ and $I'_4$) are combined as a combined network transmission packet $P_{31}(I'_1+I'_2)$ (or $P_{32}(I'_3+I'_4)$), and the transmission time interval is extended. Since the number of data to be transmitted through the wireless transmission unit 202 is decreased, the power consumption of the wireless transmission unit 202 is reduced. In this embodiment, the data is transmitted from the wireless transmission unit 202 at the extended transmission time interval (e.g., extended from 8 ms to 16 ms). However, the fixed-bit-length peripheral device transmission data $I_1$, $I_2$, $I_3$ and $I_4$ are sequentially transmitted from the second control unit 211 to the computer host 22 at the first transmission time interval $T_1$. Consequently, the data transmission speed is not reduced.

In an embodiment, the dynamic data transmission format adjustment method further comprises a judging step before the two consecutive variable-bit-length peripheral device transmission data $I'_1$ and $I'_2$ (or $I'_3$ and $I'_4$) are combined as the combined network transmission packet by the first control unit 201 (i.e., the step S23). In the judging step, the device main body 20 judges whether the key pressing data of the two consecutive variable-bit-length peripheral device transmission data $I'_1$ and $I'_2$ (or $I'_3$ and $I'_4$) are identical and whether the sensing displacement data of the two consecutive variable-bit-length peripheral device transmission data $I'_1$ and $I'_2$ (or $I'_3$ and $I'_4$) are different. If the judging condition is satisfied, the step S23 is performed to combine the two consecutive variable-bit-length peripheral device transmission data $I'_1$ and $I'_2$ (or $I'_3$ and $I'_4$) as the combined network transmission packet $P_{31}(I'_1+I'_2)$ (or $P_{32}(I'_3+I'_4)$). It is noted that the datum of judging whether the consecutive variable-bit-length peripheral device transmission data are combined is not restricted and may be varied according to the practical requirements.

An example of combining the two consecutive variable-bit-length peripheral device transmission data $I'_1$ and $I'_2$ (or $I'_3$ and $I'_4$) as the combined network transmission packet will be described as follows. For example, the variable-bit-length peripheral device transmission data I' has the data transmission format corresponding to the format type code "110" of the first byte B1. That is, the variable-bit-length peripheral device transmission data I' contains the first byte B1, the second byte B2, the third byte B3, the fourth byte B4 and the fifth byte B5. In the second byte B2 and the third byte B3, X1_B represents the byte of the first horizontal sensing displacement data in the variable-bit-length peripheral device transmission data $I'_1$ (or $I'_3$), and Y1_B represents the byte of the first vertical sensing displacement data in the variable-bit-length peripheral device transmission data $I'_1$ (or $I'_3$). In fourth byte B4 and the fifth byte B5, X2_B represents the byte of the second horizontal sensing displacement data in the next variable-bit-length peripheral device transmission data $I'_2$ (or $I'_4$), and X2_B represents the byte of the second vertical sensing displacement data in the next variable-bit-length peripheral device transmission data $I'_2$ (or $I'_4$).

From the above description, the power consumption of the battery in the wireless peripheral device is reduced according to the technology of the present invention. In other words, the technologies of the present invention are industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A dynamic data transmission format adjustment method for use between a computer host and a wireless peripheral device, the dynamic data transmission format adjustment method at least comprising steps of:
    (a) acquiring a peripheral device raw input data from a device main body of the wireless peripheral device;
    (b) converting the peripheral device raw input data into a variable-bit-length peripheral device transmission data according to a dynamic data transmission format conversion rule;
    (c) generating a network transmission packet containing the variable-bit-length peripheral device transmission data, and transmitting the network transmission packet to a wireless receiver of the wireless peripheral device;
    (d) converting and restoring the variable-bit-length peripheral device transmission data in the network transmission packet into a fixed-bit-length peripheral device transmission data according to the dynamic data transmission format conversion rule; and
    (e) transmitting the fixed-bit-length peripheral device transmission data from the wireless receiver to the computer host,
    wherein a size of the variable-bit-length peripheral device transmission data is 1 byte or plural bytes, wherein the variable-bit-length peripheral device transmission data at least contains a key pressing data, or the variable-bit-length peripheral device transmission data is a combination of the key pressing data and at least one of a wheel displacement data and a sensing displacement data.

2. The dynamic data transmission format adjustment method according to claim 1, wherein the key pressing data at least contains a left key pressing data, a middle key pressing data and a right key pressing data, or the key pressing data at least contains the left key pressing data, the middle key pressing data, the right key pressing data and at least one extension key pressing data, wherein the wheel displacement data at least contains at least one of a wheel scrolling displacement data and a wheel tilting displacement data, or the sensing displacement data at least contains a horizontal sensing displacement data and a vertical sensing displacement data.

3. The dynamic data transmission format adjustment method according to claim 1, wherein the size of the variable-bit-length peripheral device transmission data is not larger than a size of the fixed-bit-length peripheral device transmission data.

4. The dynamic data transmission format adjustment method according to claim 3, wherein the size of the variable-bit-length peripheral device transmission data is 1 byte, 2 bytes, 3 bytes, 4 bytes or 5 bytes, and the size of the fixed-bit-length peripheral device transmission data is at least 6 bytes.

5. The dynamic data transmission format adjustment method according to claim 1, wherein according to the dynamic data transmission format conversion rule, a first byte of the variable-bit-length peripheral device transmission data contains a format type code and the key pressing data, wherein according to the dynamic data transmission format conversion rule, other bytes of the variable-bit-length peripheral device transmission data contain the at least one of the wheel displacement data and the sensing displacement data.

6. The dynamic data transmission format adjustment method according to claim 5, wherein the format type code represents at least eight types of data transmission formats, wherein in a first one of the eight types of data transmission formats, the variable-bit-length peripheral device transmission data contains the key pressing data only, wherein in others of the eight types of data transmission formats, the variable-bit-length peripheral device transmission data contains the combination of the key pressing data and the at least one of the wheel displacement data and the sensing displacement data.

7. The dynamic data transmission format adjustment method according to claim 1, wherein in the step (a), the peripheral device raw input data and an additional peripheral device raw input data are consecutively acquired, wherein in the step (b), the peripheral device raw input data and the additional peripheral device raw input data are consecutively converted into the variable-bit-length peripheral device transmission data and an additional variable-bit-length peripheral device transmission data according to the data transmission format dynamic conversion rule, wherein in the step (c), a network transmission packet containing the variable-bit-length peripheral device transmission data and an additional network transmission packet containing the additional variable-bit-length peripheral device transmission data are sequentially generated, and the network transmission packet and the additional network transmission packet are sequentially transmitted from the device main body to the wireless receiver at a first transmission time interval.

8. The dynamic data transmission format adjustment method according to claim 7, wherein in the step (d), the variable-bit-length peripheral device transmission data and the additional variable-bit-length peripheral device transmission data are respectively retrieved from the network transmission packet and the additional network transmission packet by the wireless receiver, and the variable-bit-length peripheral device transmission data and the additional variable-bit-length peripheral device transmission data are converted and restored into the fixed-bit-length peripheral device transmission data and the additional fixed-bit-length peripheral device transmission data according to the data transmission format dynamic conversion rule, wherein in the step (e), the fixed-bit-length peripheral device transmission data and the additional fixed-bit-length peripheral device transmission data are sequentially transmitted to the computer host at the first transmission time interval.

9. The dynamic data transmission format adjustment method according to claim 1, wherein in the step (a), the peripheral device raw input data and an additional peripheral device raw input data are consecutively acquired, wherein in the step (b), the peripheral device raw input data and the additional peripheral device raw input data are consecutively converted into the variable-bit-length peripheral device transmission data and an additional variable-bit-length peripheral device transmission data according to the data transmission format dynamic conversion rule, wherein in the step (c), the variable-bit-length peripheral device transmission data and the additional variable-bit-length peripheral device transmission data are combined as a combined network transmission packet by the device main body, and the combined network transmission packet is transmitted from the device main body to the wireless receiver at a second transmission time interval, wherein the second transmission time interval is an integer multiple of a first transmission time interval.

10. The dynamic data transmission format adjustment method according to claim 9, wherein in the step (d), the variable-bit-length peripheral device transmission data and the additional variable-bit-length peripheral device transmission data are retrieved from the combined network transmission packet by the wireless receiver, and the variable-bit-length peripheral device transmission data and the additional variable-bit-length peripheral device transmission data are respectively converted and restored into the fixed-bit-length peripheral device transmission data and the additional fixed-bit-length peripheral device transmission data according to the data transmission format dynamic conversion rule, wherein in the step (e), the fixed-bit-length peripheral device transmission data and the additional fixed-bit-length peripheral device transmission data are sequentially transmitted to the computer host at the first transmission time interval.

11. The dynamic data transmission format adjustment method according to claim 9, wherein in the step (c), if the device main body judges that the key pressing data in the variable-bit-length peripheral device transmission data and the key pressing data in the additional variable-bit-length peripheral device transmission data are identical and the sensing displacement data in the variable-bit-length peripheral device transmission data and the sensing displacement data in the additional variable-bit-length peripheral device transmission data are different, the variable-bit-length peripheral device transmission data and the additional variable-bit-length peripheral device transmission data are combined as the combined network transmission packet by the device main body, and the combined network transmission packet is transmitted from the device main body to the wireless receiver after the second transmission time interval.

12. A wireless peripheral device electrically connected with a computer host, the wireless peripheral device comprising:
   a device main body comprising a first control unit and a wireless transmission unit, wherein after the first control unit acquires a peripheral device raw input data, the peripheral device raw input data is converted into a fixed-bit-length peripheral device transmission data by the first control unit according to a dynamic data transmission format conversion rule, wherein after a network transmission packet containing the variable-bit-length peripheral device transmission data is generated by the first control unit, the network transmission packet is outputted through the wireless transmission unit; and
   a wireless receiver electrically connected with the computer host, wherein the wireless receiver comprises a second control unit and a wireless receiving unit, wherein after the wireless receiving unit receives the network transmission packet, the variable-bit-length peripheral device transmission data in the network transmission packet is converted and restored into a fixed-bit-length peripheral device transmission data by the second control unit according to the dynamic data transmission format conversion rule, and the fixed-bit-length peripheral device transmission data is transmitted from the second control unit to the computer host, wherein a size of the variable-bit-length peripheral device transmission data is 1 byte or plural bytes, wherein the variable-bit-length peripheral device transmission data at least contains a key pressing data, or the variable-bit-length peripheral device transmission data is a combination of the key pressing data and at least one of a wheel displacement data and a sensing displacement data.

13. The wireless peripheral device according to claim 12, wherein the key pressing data at least contains a left key pressing data, a middle key pressing data and a right key pressing data, or the key pressing data at least contains the left key pressing data, the middle key pressing data, the right key pressing data and at least one extension key pressing data, wherein the wheel displacement data at least contains at least one of a wheel scrolling displacement data and a wheel tilting displacement data, or the sensing displacement data at least contains a horizontal sensing displacement data and a vertical sensing displacement data.

14. The wireless peripheral device according to claim 12, wherein the size of the variable-bit-length peripheral device transmission data is not larger than a size of the fixed-bit-length peripheral device transmission data.

15. The wireless peripheral device according to claim 14, wherein the size of the variable-bit-length peripheral device transmission data is 1 byte, 2 bytes, 3 bytes, 4 bytes or 5 bytes, and the size of the fixed-bit-length peripheral device transmission data is at least 6 bytes.

16. The wireless peripheral device according to claim 12, wherein according to the dynamic data transmission format conversion rule, a first byte of the variable-bit-length peripheral device transmission data contains a format type code and the key pressing data, wherein according to the dynamic data transmission format conversion rule, other bytes of the variable-bit-length peripheral device transmission data contains the at least one of the wheel displacement data and the sensing displacement data.

17. The wireless peripheral device according to claim 16, wherein the format type code represents at least eight types of data transmission formats, wherein in a first one of the eight types of data transmission formats, the variable-bit-length peripheral device transmission data contains the key pressing data only, wherein in others of the eight types of data transmission formats, the variable-bit-length peripheral device transmission data contains the combination of the key pressing data and the at least one of the wheel displacement data and the sensing displacement data.

18. The wireless peripheral device according to claim 12, wherein after the peripheral device raw input data and an additional peripheral device raw input data are consecutively acquired by the first control unit, the peripheral device raw input data and the additional peripheral device raw input data are consecutively converted into the variable-bit-length peripheral device transmission data and an additional variable-bit-length peripheral device transmission data according to the data transmission format dynamic conversion rule, wherein after the network transmission packet containing the variable-bit-length peripheral device transmission data and an additional network transmission packet containing the additional variable-bit-length peripheral device transmission data are sequentially generated, the network transmission packet and the additional network transmission packet are sequentially transmitted from the first control unit to the wireless receiver through the wireless transmission unit at a first transmission time interval.

19. The wireless peripheral device according to claim 12, wherein after the peripheral device raw input data and an additional peripheral device raw input data are consecutively acquired by the first control unit, the peripheral device raw input data and the additional peripheral device raw input data are consecutively converted into the variable-bit-length peripheral device transmission data and an additional variable-bit-length peripheral device transmission data according to the data transmission format dynamic conversion rule, wherein after the variable-bit-length peripheral device transmission data and the additional variable-bit-length peripheral device transmission data are combined as a combined network transmission packet by the first control unit, the combined network transmission packet is transmitted from the first control unit to the wireless receiver through the wireless transmission unit at a second transmission time interval, wherein the second transmission time interval is an integer multiple of a first transmission time interval.

20. The wireless peripheral device according to claim 19, wherein after the combined network transmission packet is received by the wireless receiving unit, the variable-bit-length peripheral device transmission data and the additional variable-bit-length peripheral device transmission data in the combined network transmission packet are respectively retrieved by the second control unit, and the variable-bit-length peripheral device transmission data and the additional variable-bit-length peripheral device transmission data are converted and restored into the fixed-bit-length peripheral device transmission data and the additional fixed-bit-length peripheral device transmission data according to the data transmission format dynamic conversion rule, wherein the fixed-bit-length peripheral device transmission data and the additional fixed-bit-length peripheral device transmission data are sequentially transmitted to the computer host at the first transmission time interval.

\* \* \* \* \*